United States Patent
Schlangen (10) Patent No.: US 6,261,199 B1
(45) Date of Patent: Jul. 17, 2001

(54) NON-BACK DRIVE POWER TRANSMISSION (76) Inventor: Phillip E. Schlangen, 1920 S. First St. No. 1601, Minneapolis, MN (US) 55454

( * ) Notice: Subject to any disclaimer, the term of this patent is extended or adjusted under 35 U.S.C. 154(b) by 0 days.

(21) Appl. No.: 09/370,859

(22) Filed: Aug. 9, 1999

Related U.S. Application Data (60) Provisional application No. 60/095,864, filed on Aug. 10, 1998.

(51) Int. Cl.[7] .............................. F16H 1/32; F16H 23/00
(52) U.S. Cl. ............................................ 475/163; 475/170
(58) Field of Search ................................... 475/162, 176, 475/178, 180, 181, 163, 170; 74/434, 440

(56) References Cited

U.S. PATENT DOCUMENTS

| | | | |
|---|---|---|---|
| 2,014,316 | 9/1935 | Farrell | 74/305 |
| 2,178,443 | 10/1939 | Wallace, Jr. | 74/307 |
| 2,475,504 * | 7/1949 | Jackson | 74/804 |
| 2,883,017 | 4/1959 | Jungles | 192/8 |
| 2,995,226 | 8/1961 | Gilder | 192/8 |
| 3,965,773 | 6/1976 | Bert et al. | 74/804 |
| 4,016,780 * | 4/1977 | Baranyi | 74/804 |
| 4,512,213 | 4/1985 | Newton | 74/805 |
| 4,621,543 | 11/1986 | Gabilondo | 74/805 |
| 4,640,154 | 2/1987 | Osborn | 74/805 |
| 4,762,025 | 8/1988 | Lew | 74/804 |
| 4,994,005 | 2/1991 | Rennerfelt | 475/162 |
| 5,616,095 * | 4/1997 | Pruitt | 475/178 |
| 5,759,130 | 6/1998 | Woytaszek | 475/339 |

* cited by examiner

*Primary Examiner*—Charles A Marmor
*Assistant Examiner*—Tisha D. Lewis (57) ABSTRACT

A power transmission has a stationary internal gear surrounding an external gear having a diameter smaller than diameter of the internal gear. The internal gear is mounted on an eccentric joint joined to the power input shaft and is retained in engagement with a segment of the teeth of the internal gear with an arm and roller riding on the internal surface of the external gear. A driven shaft is operatively connected to the external gear with the eccentric and rollers located in holes in a circular flange of the external gear.

37 Claims, 10 Drawing Sheets

INPUT CURVE

FIG. 10

OUTPUT CURVE

FIG. 11

NON-BACK DRIVE POWER TRANSMISSION

CROSS REFERENCE TO RELATED APPLICATION

This application claims the priority of U.S. Provisional Patent Application Ser. No. 60/095,864 filed Aug. 10, 1998.

FIELD OF THE INVENTION

The invention is in the field of power transmissions and gear boxes having non-back drive and lock-up features.

BACKGROUND OF THE INVENTION

Non-back-drivable gearboxes function to transmit torque from a high speed, low torque input shaft to a low-speed, high torque output shaft and does not transmit torque from the output shaft back to the input shaft. Conventional non-back-drivable power transmissions include worm gears and lead screws. Worm gearing is used for obtaining large speed reductions between non-intersecting shafts. The velocity ratio of worm gearing is the ratio between the number of teeth on the gear and the number of threads on the worm. The non-reverse drive characteristics of worm gearing relies on friction. It is required for non-back drive transmissions to have the power lost to friction equal to or greater than the output power. The theoretical maximum efficiency of a conventional non-back-derivable worm gearing is 50 percent.

Power transmissions having spur gears are disclosed in the prior art. W. J. Wallace Jr. in U.S. Pat. No. 2,178,443 discloses a non-reversible motion transmission mechanism having drive and driven shafts connected to planetary spur gears which are moved outwardly into engagement with a fixed ring spur gear when torque is applied to the driven shaft. J. A. Gilder in U.S. Pat. No. 2,995,226 discloses a reverse torque lock mechanism having a moving lock member that is forced into engagement with a fixed ring gear when reverse torque is applied to an output or driven shaft.

SUMMARY OF THE INVENTION

The invention is a non-back drive power transmission that utilizes a power transmitting gear to transmit torque from a high speed input shaft to a low speed output shaft and prohibits the transmission of torque from the output shaft back to the input shaft. The transmission does not rely on friction between gears or parts to predicate its non-back drive or lock-up function. The non-back drive power transmission is applicable to aircraft controls surfaces, conveyor systems, passenger and freight elevators, boat trailer hoists, sail boat rigging systems, carnival rides, robot joints, high-tension cable tightening systems, door counterbalancing systems, and power transmitting apparatus that requires one-way drives with no back drive.

The non-back drive power transmission has a case with a stationary internal gear having spur teeth circumferentially located around the inside of the case. End plates attached to opposite sides of the case enclose the space within the internal gear. An input shaft rotatably mounted on one end plate supports an eccentric member which rotatably supports an external gear having spur teeth adapted to mesh with the teeth of the internal gear. The external gear is smaller in diameter then the diameter of the internal gear and has fewer teeth than the internal gear. The internal and external gears have complementary teeth with segments of the teeth that mesh when the external gear is turned around the fixed gear. The external gear is drivably connected with an output shaft rotatably mounted on the other end plate. The internal gear has an inside circumferential surface or track spaced inwardly from the teeth. The input shaft has an arm with a roller that rides on the track to maintain with the eccentric member segments of the external gear teeth in meshing engagements with fixed teeth on the case as the external gear moves around the internal gear. Torque applied to the output shaft is not transmitted to the input shaft as the roller holds the external gear in locking engagement with the fixed gear.

DESCRIPTION OF THE PREFERRED EMBODIMENT OF THE NON-REVERSIBLE DRIVE OF THE INVENTION

The hypocycloid non-reversible drive 10 is a power transmission shown in FIGS. 1 to 4, having a cylindrical housing or case 11 sandwiched between end plates 12 and 13. A plurality of bolts 14 located in aligned holes in case 11 and end plates 12 and 13 hold end plates 12 and 13 and case 11 in the fixed assembled relationship. The end plates 12 and 13 have holes 15 in each corner to accommodate bolts to secure drive 10 to a fixed support.

Figure 1:
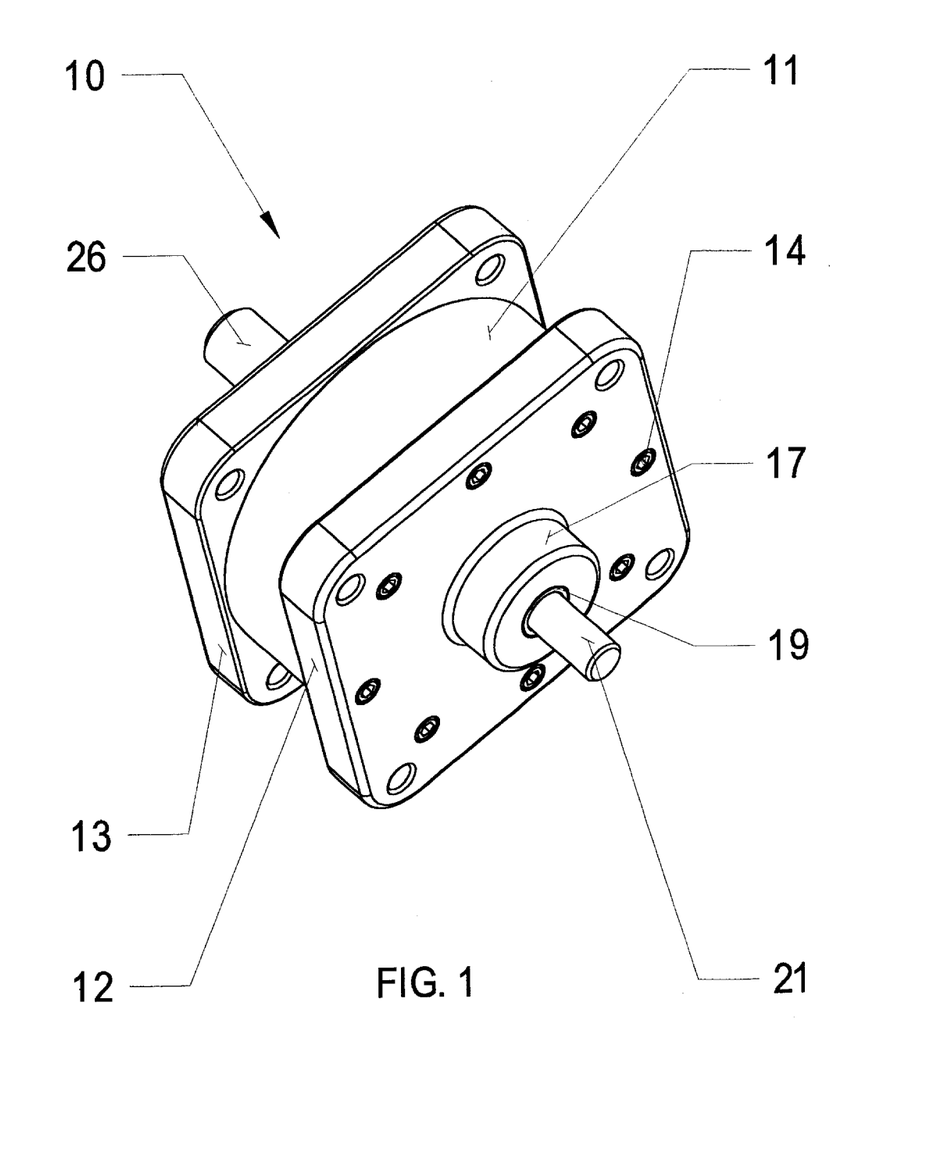
FIG. 1 is a perspective view of the HYPOCYCLOID NON-REVERSIBLE DRIVE of the invention.
Figure 2:
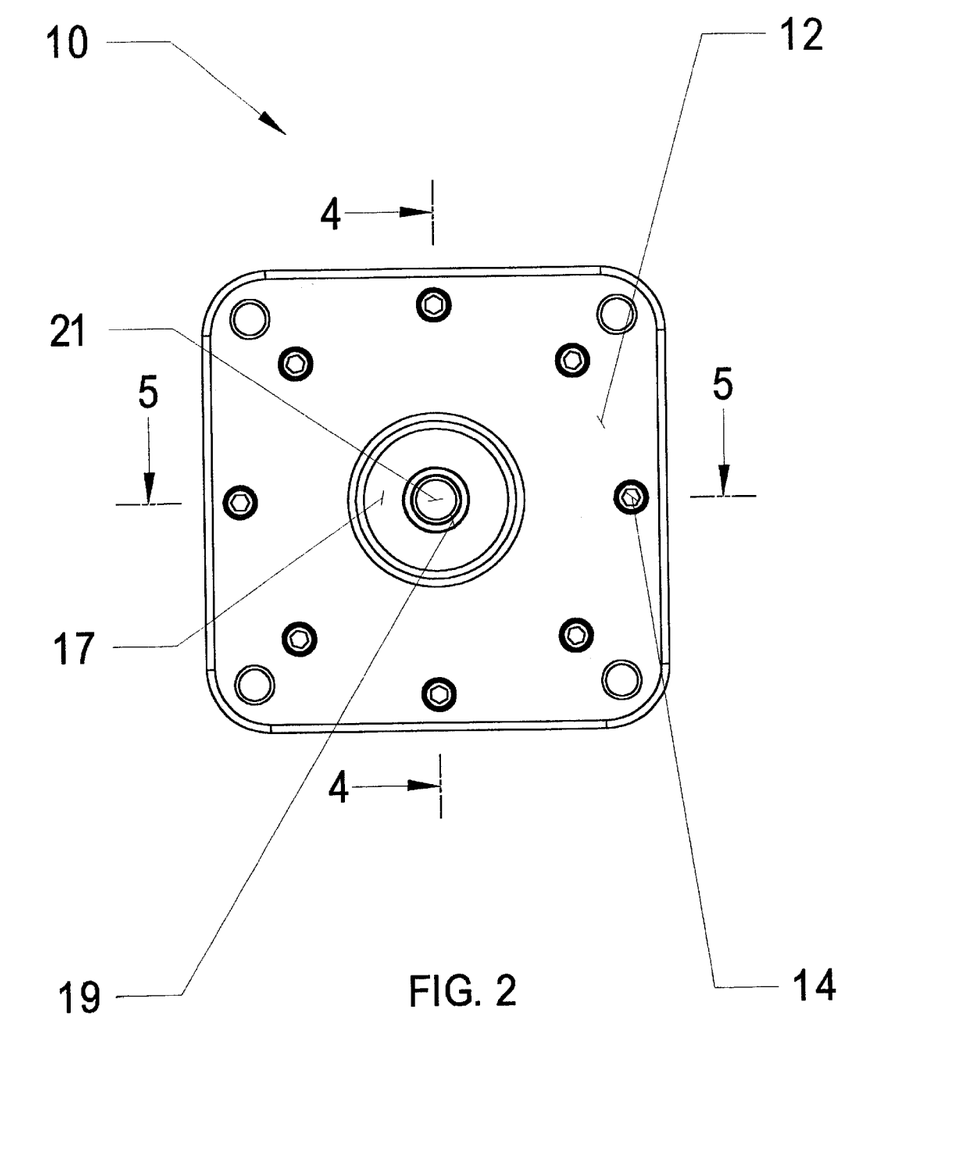
FIG. 2 is an enlarged end elevational view thereof.
Figure 3:
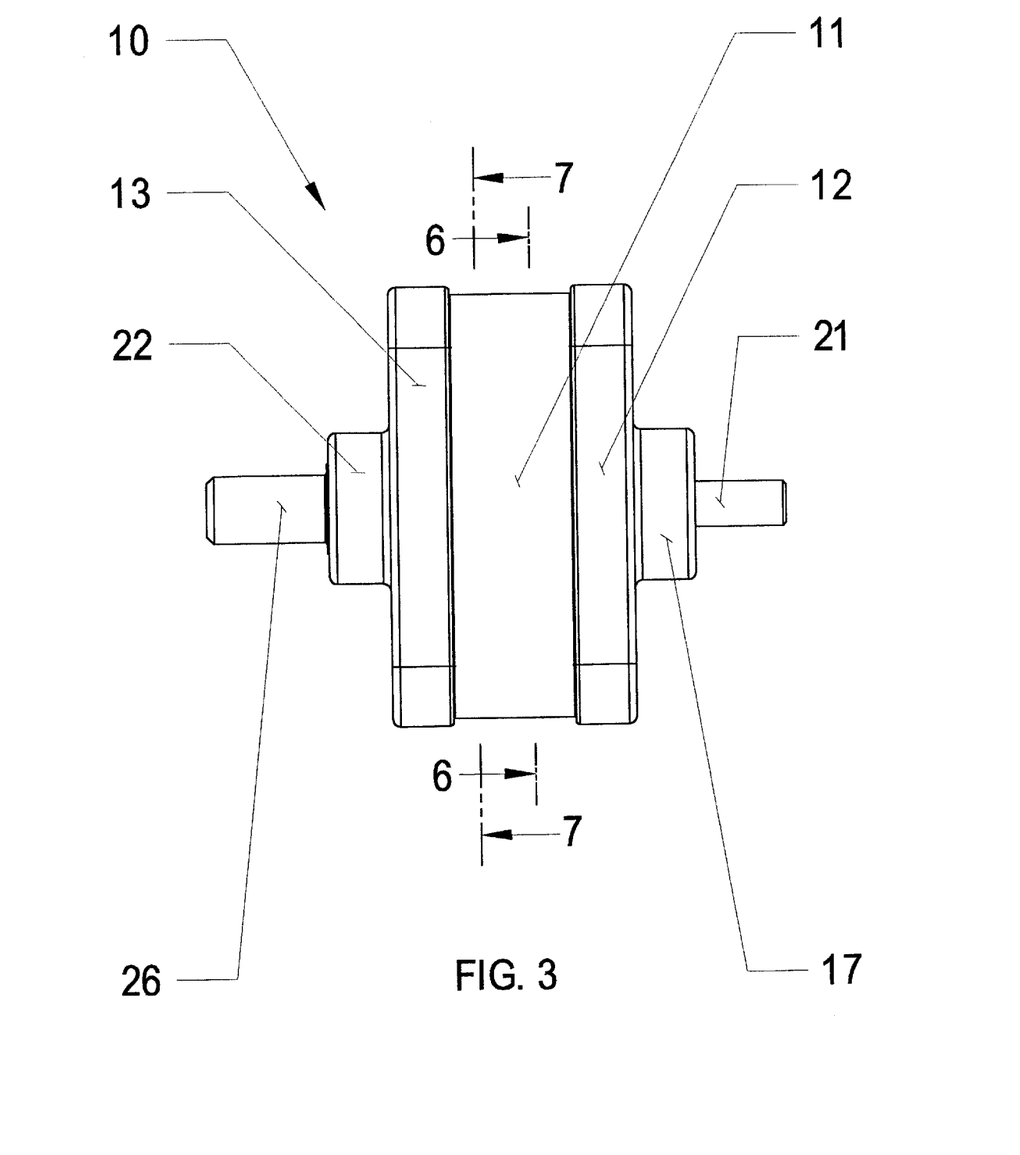
FIG. 3 is an enlarged side elevational view thereof.
Figure 4:
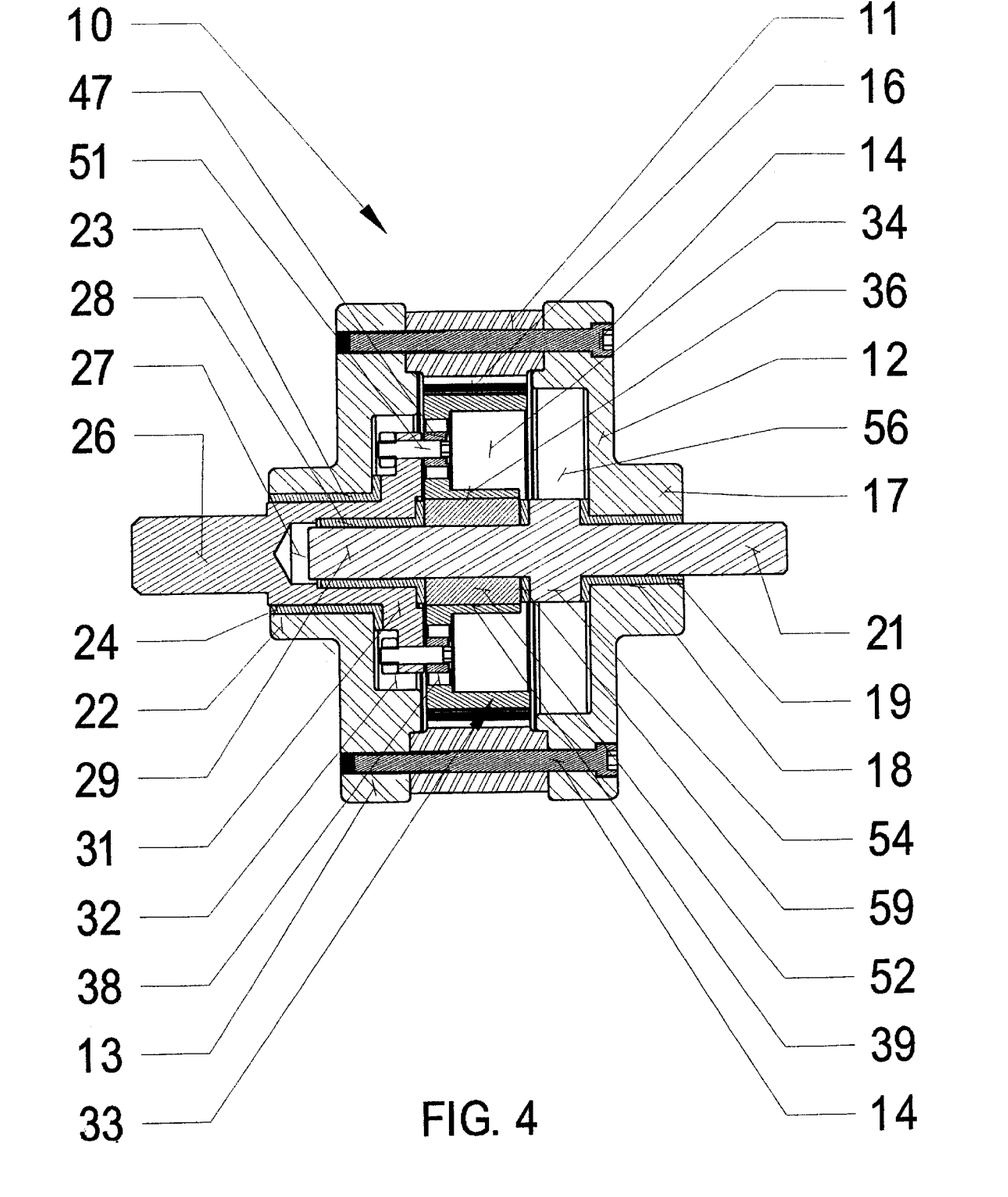
FIG. 4 is a sectional view taken along line 4—4 of FIG. 2.
Figure 5:
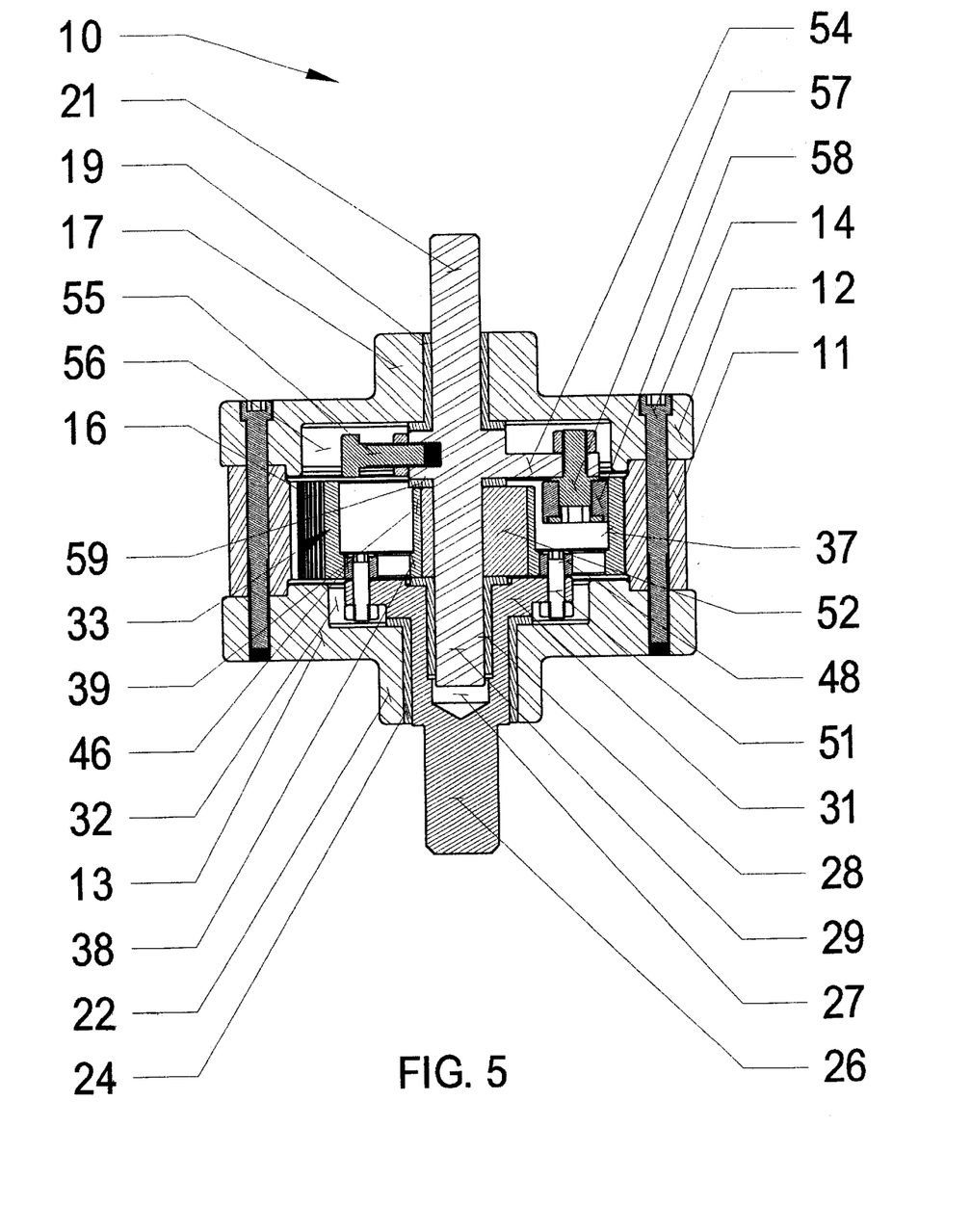
FIG. 5 is a sectional view taken along line 5—5 of FIG. 2.

As shown in FIG. 5, case 11 has an internal gear having a ring of fixed spur gear teeth 16. Returning to FIG. 4, end plate 12 has an outwardly directed hub 17 with an axial bore 18 accommodating a sleeve bearing 19. A first shaft 21 rotatably mounted in bearing 19 extends axially through case 11 into a sleeve bearing 28 located in a blind bore 27 in the inner end of a second shaft 26. First shaft 21 is the power-input shaft. Second shaft 26 is the power output shaft. Second shaft 26 rotates in a sleeve bearing 24 located in a bore 23 in end plate 13 and a hub 22 or end plate 13. A circular flange 31 located on the inner end of shaft 26 is positioned in a cylindrical cavity 32 on the inside of end plate 13.

Figure 6:
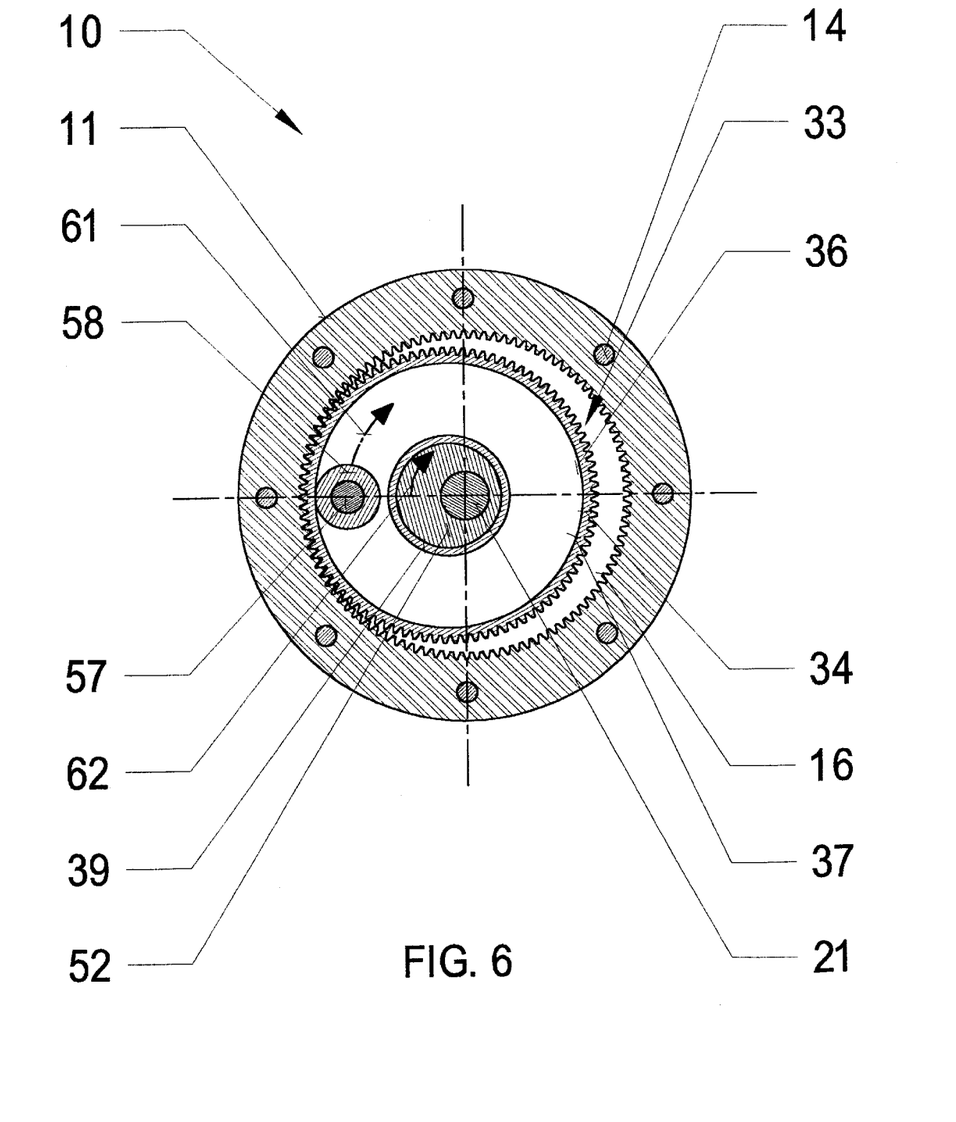
FIG. 6 is a sectional view taken along line 6—6 of FIG. 3.

Shaft 26 is drivably coupled to a ring gear 33 having a cylindrical rim 34 with external spur gear teeth 36. As shown in FIG. 6, rim 34 has an outside diameter smaller than the diameter of the circle of internal gear teeth 16 of case 11. Gear 33 has fewer teeth 36 than gear teeth 16. For example, the fixed gear can have 64 teeth 16 and the gear 33 can have 56 teeth 36. The power ratio with these teeth numbers is 8 to 1. The inside of rim 34 has a continuous and smooth cylindrical surface or track 37. Surface 37 is concentric with the axis of gear 33. The profiles of gear teeth 16 and 36 are compatible with each other to allow gear 33 to mesh with teeth 16 as it moves around the inside of case 11. Gear 33 has a circular back wall 38 joined to one end of rim 34. The central portion of wall 38 supports a sleeve 39 extended into the space surrounded by cylindrical surface 34 of rim 34.

Figure 7:
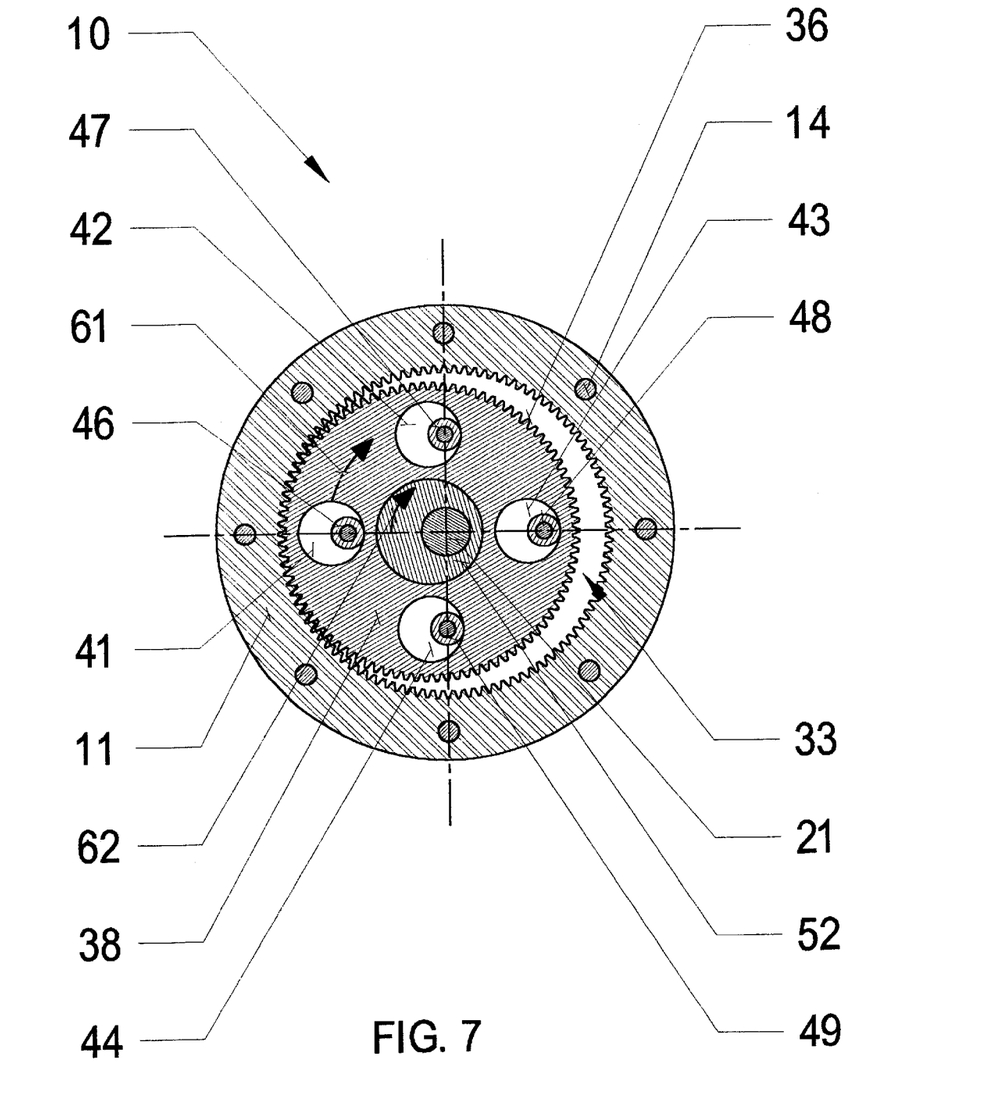
FIG. 7 is a sectional view taken along line 7—7 of FIG. 3.

As shown in FIG. 7, wall 38 has four circular holes 41, 42, 43, and 44 circumferentially spaced around sleeve 39. The distance between the centers of adjacent holes is 90 degrees. The number of holes in wall 38 can vary. The diameter of each hole is slightly less than the radial distance between the outside of sleeve 39 and cylindrical surface 37 of rim 34. Cylindrical members or rollers 46, 47, 48 and 49 located in holes 41, 42, 43 and 44 ride on the circular surfaces of wall 38 surrounding holes 41, 42, 43 and 44. Nut and bolt assemblies 51 attached to flange 31 rotatably support rollers 46, 47, 48, and 49 and retain the rollers in the confines of holes 41–44.

An eccentric member 52 mounted on shaft 21 has a cylindrical outer surface 53 located within sleeve 39 to rotatably support gear 33 within case 11 on shaft 21. Eccentric member 52 may be splined or keyed to shaft 21. Member 52 can alternatively be integral with shaft 21. Rotation of shaft 21 turns ring gear 33 and eccentric member 52 about the axis of shaft 21. The center of eccentric member 52 is offset from the center of shaft 21 a distance equal to one half the maximum distance between the pitch lines of teeth 16 and 34, as seen in FIGS. 6 and 7, so as to maintain a section of teeth 36 in engagement with a segment of teeth 16 on case 11 as gear 33 turns relative to case 11.

Figure 8:
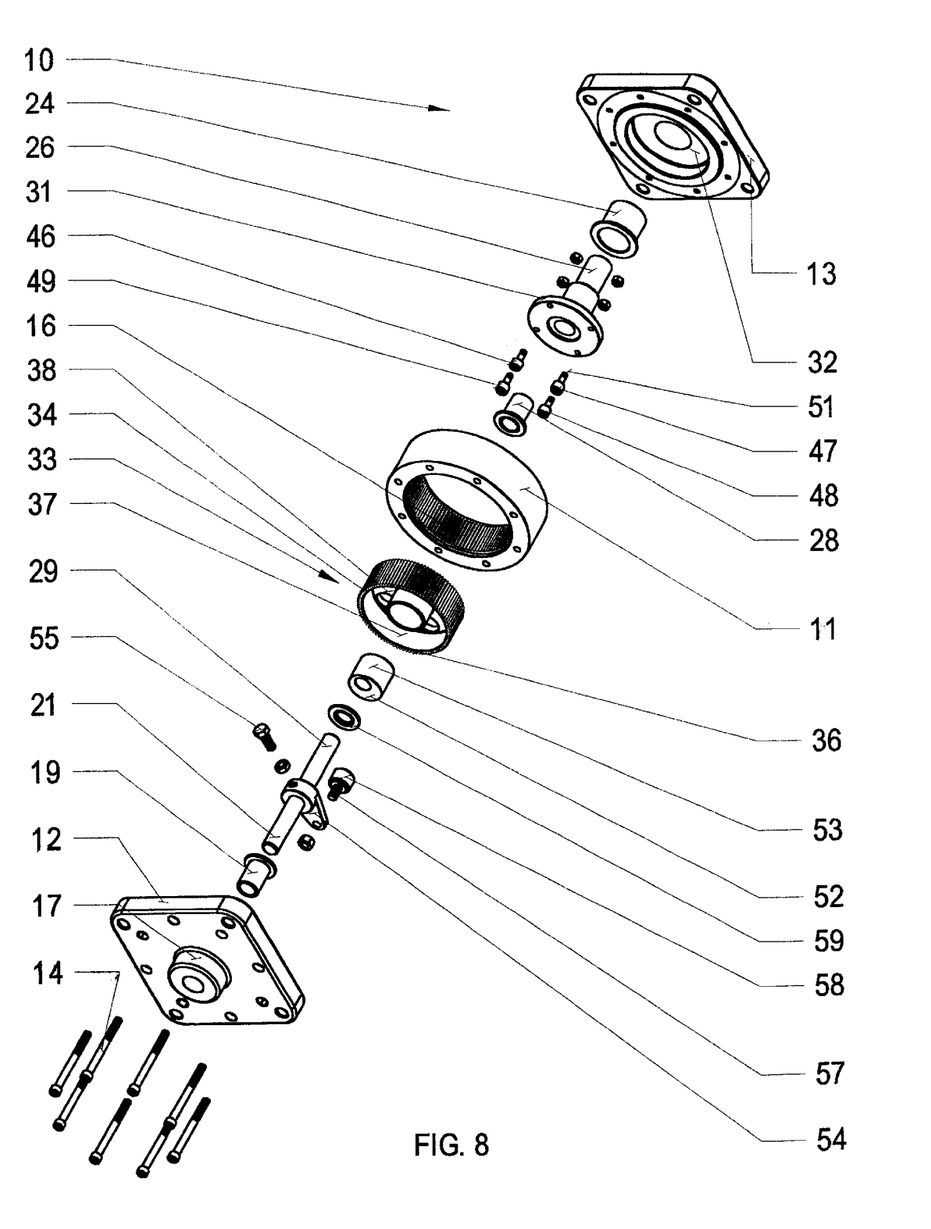
FIG. 8 is an exploded perspective view of the HYPOCYCLOID NON-REVERSIBLE DRIVE of FIG. 1.

As seen in FIGS. 5 and 8, the middle portion of shaft 21 has an outwardly directed arm 54 that circumferentially moves in a recess 56 in the inside of end plate 12. Shaft 21 and arm 54 are a one-piece cast metal structure. A nut and bolt assembly 57 connected to the outer end of arm 54 rotatably supports a cylindrical roller 58. As shown in FIGS. 5 and 6, roller 58 rides on internal cylindrical surface 37 of gear 33 and maintains with eccentric member 52 a segment of teeth 34 in meshing engagement with a section of teeth 16 of case 11. A washer 59 on shaft 21 located between eccentric member 52 and arm 54 maintains a small axial space between eccentric member 52 and arm 54. An adjustable bolt 55 secured to shaft 21 opposite arm 54 counterbalances arm 54 and roller 58.

In use, rotational force or power is applied to shaft 21. An electric or fluid powered motor can be used to rotate shaft 21. Roller 58 on the outer end of arm 58 retains along with eccentric member 52 a segment of gear teeth 36 in mesh with a segment of teeth 16 of case 11, as shown in FIG. 6. Shaft 21 angularly moves roller 58 on surface 37 of rim 34. The teeth 36 of gear 33 progressively meshes with teeth 16 of case 11 around the entire 360 degree range of teeth 16. Gear 33 turns on eccentric member 52 in the direction of arrow 61 when shaft is turned in the direction of arrow 62. Roller 58 and eccentric member 52 maintains meshing engagement of teeth 36 and 16 during the entire rotation of gear 33. The speed ration between shafts 21 and 26 is the ratio between the number of teeth 16 of case 11 and the difference between the number of teeth 16 and the number of teeth 36 of gear 34.

The wall 38 of gear 33 contacts roller 47 located in hole 42 and turns shaft 26 in response to turning of gear 33. Rollers' 48, 49 and 46 progressively drive shaft 26 as gear 33 moves around internal gear teeth 16 of case 11. Torque is transmitted through all four rollers 46–49. The roller shanks are designed to handle the loads. The number of rollers can be increased to handle large torque loads. Space requirements will limit the number of rollers used to drive shaft 26.

Figure 9:
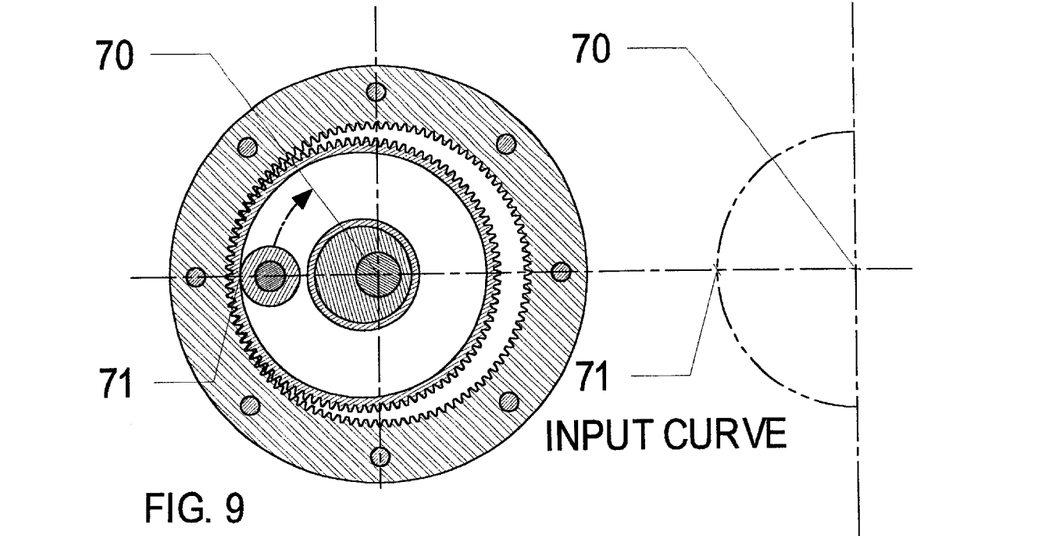
FIG. 9 is a sectional view of FIG. 6 illustrating the power input curve of the drive.
Figure 10:
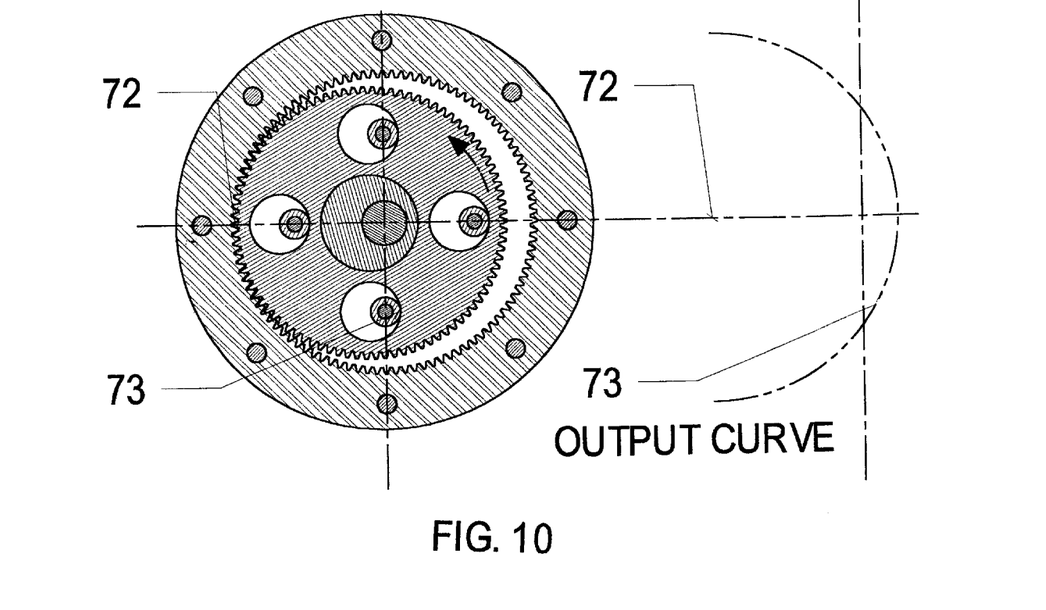
FIG. 10 is a sectional view of FIG. 7 illustrating the power output curve of the drive.
Figure 11:
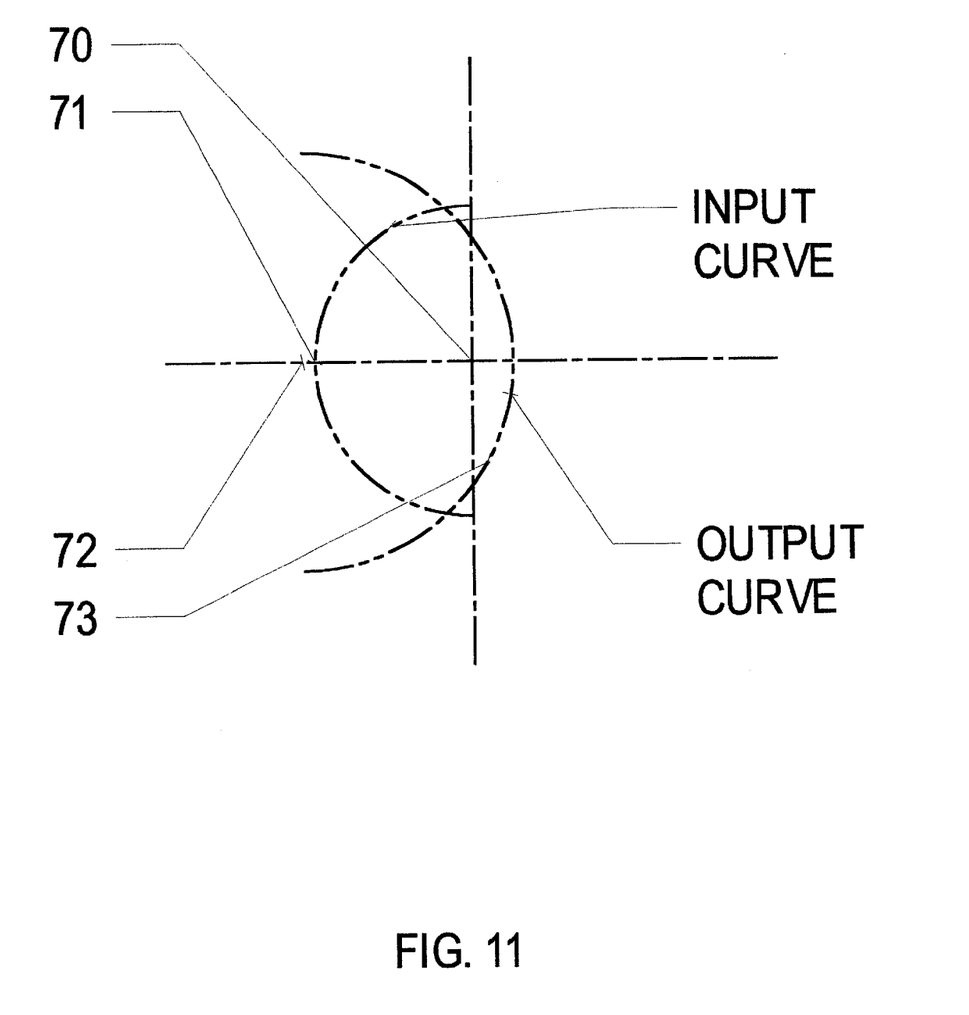
FIG. 11 is a diagrammatic view of the power input curve superimposed on the power output curve of the drive.

The drive 10 does not have reverse drive as gear 33 locks up on internal gear teeth 16 of case 11 when torque is applied to out put shaft 26. The eccentric member 52 and arm 54 are not turned when torque is applied to shaft 26. Roller 58 holds gear teeth 36 in a fixed position relative to stationary teeth 16 of case 11. This prevents back drive of shaft 26. In order to prevent back drive the power input circle 71, shown in FIG. 9, having rotational axis 70 of surface 37 is off-set from the power output circle 73, shown in FIG. 10, having a rotational axis 72 on teeth 16. These two circles 71 and 73 are not tangent at any point as shown in FIG. 11. The circles 71 and 73 are constrained by mechanical links and prescribed motion paths and will not allow back drive without deformation of the links.

While there is shown and descried a preferred embodiment of the non-reversible drive of the invention, it is understood that changes and modifications of the gear and parts of the drive can be made by one skilled in the art without departing from the invention. The invention is defined in the following claims.

What is claimed is:

1. A hypocycloid non-back drive comprising: a stationary housing having opposite ends, a first end plate secured to one end of the housing, a second end plate secured to the other end of the housing, said housing having an internal spur gear, said internal spur gear having a circular arrangement of inwardly directed spur gear teeth, a first shall rotatably mounted on the first end plate, a second shaft rotatably mounted on the second end plate, said first and second shafts having axially aligned rotational axes, a ring gear having a circular arrangement of external spur gear teeth, said ring gear having a diameter smaller than the diameter of the circular arrangement of the teeth of the internal spur gear whereby a portion of the external spur gear teeth mesh with a portion of the internal spur gear teeth, said ring gear having a continuous and smooth cylindrical inside surface concentric with the circular arrangement of the external spur gear teeth, a radially extended arm means secured to the first shaft engageable with the cylindrical inside surface of the ring gear and movable with the first shaft, eccentric means mounted on the first shaft, said arm means and eccentric means extended in the same outward radial direction, means mounting the ring gear on the eccentric means whereby rotation of the first shaft turns the arm means which acts against said cylindrical inside surface wherein the eccentric means rotatably turns about the rotational axis of the input shaft, and moves the ring gear around the internal spur gear teeth on the housing, said arm means having a radial length greater than the off-set of the eccentric means from the axis of rotation of the first shaft, a circular flange secured to the second shaft, said ring gear having a wall having a plurality of openings, and means mounted on the flange extended into the openings whereby on movement of the ring gear around the internal spur gear teeth on the housing by rotation of the first shaft rotates the second shaft.

2. The drive of claim 1 wherein: the second shaft has a blind bore in an end thereof, and said first shaft having an end portion located in said blind bore and rotatably mounted on the second shaft to support the end portion of the first shaft.

3. The drive of claim 1 wherein: the internal spur gear has 64 internal teeth and the ring gear has 56 external teeth.

4. The drive of claim 1 wherein: the ring gear has a rim having said external spur gear teeth and cylindrical inside surface, said wall being joined to the rim, and a sleeve joined to the wall, said sleeve being rotatably mounted on the eccentric means.

5. The drive of claim 1 wherein: the first end plate has a hub with an axial bore, and bearing means located in said bore rotatably accommodating the first shaft.

6. The drive of claim 1 wherein: the second end plate has a hub with an axial bore, and bearing means located in said bore rotatably accommodating the second shaft.

7. The drive of claim 1 wherein: the second shaft has a first axial bore, said first shaft having an end portion located in said bore, first bearing means located in said bore rotatably supporting the end portion of the first shaft, said second end plate having a second axial bore concentric with the first axial bore, and second bearing means located in said second axial bore rotatably mounting the second shaft on the second end plate, said first and second bearing means being generally radially aligned with each other.

8. The drive of claim 1 wherein: the eccentric means is an eccentric member having a cylindrical hole, said first shaft having a cylindrical shaft portion extended through said hole to rotatably mount the eccentric member on said first shaft.

9. The drive of claim 4 wherein: the openings in said wall are circular holes, and the means mounted on the flange include rollers extended into the holes and engageable with said wall.

10. The drive of claim 4 wherein: the wall of the ring gear has four circumferentially spaced circular openings, said means mounted on the flange comprise four rollers extended into said openings and engageable with said wall, said rollers having diameters smaller than the diameters of said openings.

11. The drive of claim 4 wherein: the second shaft has a bore in an end thereof, said first shaft having an end portion located in said bore and rotatably mounted on the second shaft to support the end portion of the first shaft.

12. The drive of claim 9 wherein: the rollers have diameters smaller than the diameters of the holes.

13. The drive of Claim 11 including: bearing means rotatably supporting the end portion of the first shaft on the second shaft.

14. A hypocycloid non-back drive comprising: a stationary housing having an internal gear with a circular arrangement of inwardly directed teeth, a first shaft, a second shaft, means rotatably mounting the first and second shafts on the housing, a ring gear having a circular arrangement of external teeth and a diameter smaller than the diameter of the circular arrangement of the teeth of the internal gear whereby a portion of the external gear teeth mesh with a portion of the internal gear teeth, said ring gear having a continuous cylindrical inside surface concentric with the circular arrangement of the external gear teeth, first means non-rotatably connected to the first shaft and extended radially outwardly from the first shaft, second means connected to the first means engageable with the cylindrical inside surface of the ring gear and movable around said inside surface of the ring gear with the first shaft, eccentric means mounted on the first shaft, said first means and eccentric means extended in the same outward radial direction, means mounting the ring gear on the eccentric means whereby rotation of the first shaft turns the first and second means which acts against the cylindrical inside surface of the ring gear and moves the ring gear around the internal gear teeth on the housing and turns the eccentric means about the rotational axis of the first shaft, said first means having a radial length greater than the off-set of the eccentric means from the axis of rotation of the first shaft, and means drivably connecting the second shaft and ring gear whereby movement of the ring gear around the internal gear teeth rotates the second shaft.

15. The drive of claim 14 wherein: the second shaft has a bore in an end thereof, said first shaft having an end portion located in said bore and rotatably mounted on the second shaft to support the end portion of the first shaft.

16. The drive of claim 14 wherein: the internal spur gear has 64 internal teeth and the ring gear has 56 external teeth.

17. The drive of claim 14 wherein: the means drivably connecting the second shaft and ring gear includes a flange secured to the second shaft, said ring gear having a rim and an wall having openings joined to the rim, means mounted on the flange extended into the openings to drivably connect the wall and flange, and a sleeve joined to the wall, said sleeve being rotatably mounted on the eccentric means.

18. The drive of claims 14 wherein: the second shaft has a first axial bore, said first shaft having an end portion located in said bore, first bearing means located in said bore rotatably supporting the end portion of the first shaft, said housing having a second axial bore concentric with the first axial bore, and second bearing means located in said second axial bore rotatably mounting the second shaft on the second end plate, said first and second bearing means being generally radially aligned with each other.

19. The drive of claim 14 wherein: the eccentric means is an eccentric member having a cylindrical hole, said first shaft having a cylindrical shaft portion extended through said hole to rotatably mount the eccentric member on said first shaft.

20. The drive of claim 15 including: bearing means rotatably supporting the end portion of the first shaft on the second shaft.

21. The drive of claim 17 wherein: the openings in said wall are circular holes, and the means mounted on the flange include rollers extended into the holes and engageable with said wall.

22. The drive of claim 21 wherein: the rollers have diameters smaller than the diameters of the holes.

23. A hypocycloid non-back drive comprising: a stationary housing having opposite ends, a first end plate secured to one end of the housing, a second end plate secured to the other end of the housing, said housing having an internal spur gear, said internal spur gear having a circular arrangement of inwardly directed spur gear teeth, a first power input shaft rotatably mounted on the first end plate, a second power output shaft rotatably mounted on the second end plate, said first and second shafts having axially aligned rotational axes, a ring gear having a circular arrangement of external spur gear teeth and a diameter smaller than the diameter of the circular arrangement of the teeth of the internal spur gear whereby a portion of the external spur gear teeth mesh with a portion of the internal spur gear teeth, said ring gear having a continuous and smooth cylindrical inside surface concentric with the circular arrangement of external spur gear teeth, a rigid arm secured to and extended radially outwardly from the first shaft adjacent the cylindrical inside surface of the ring gear, roller means connected to the arm located in continuous engagement with the cylindrical inside surface of the ring gear and movable with the arm when the first shaft is rotated, eccentric means mounted on the first shaft in radial alignment with the ring gear, means mounting the ring gear on the eccentric means whereby rotation of the first shaft turns the arm, and roller means and moves the ring gear around the internal spur gear teeth on the housing and turns the eccentric means about the rotational axis of the power input shaft, said arm and roller means having a combined radial length greater than the off-set of the eccentric means from the axis of rotation of the first shaft, a circular flange secured to the second shaft, said ring gear having a wall having a plurality of openings, and means mounted on the flange extended into the openings whereby on movement of the ring gear around the internal spur gear teeth on the housing by rotation of the first shaft rotates the second shaft.

24. The drive of claim 23 wherein: the second shaft has a blind bore in an end thereof, and said first shaft having an end portion located in said blind bore and rotatably mounted on the second shaft to support the end portion of the first shaft.

25. The drive of claim 23 wherein: the ring gear has a rim having said external spur gear teeth and cylindrical inside surface, said wall being joined to the rim, and a sleeve extended axially from the wall, said sleeve surrounding and rotatably mounted on the eccentric means.

26. The drive of claim 23 wherein: the openings in said wall are circular holes, and the means mounted on the flange include rollers extended into the openings and engageable with said wall.

27. The drive of claim 23 wherein: the eccentric means is an eccentric member having a cylindrical hole, said first shaft having a cylindrical shaft portion extended through said hole to rotatably mount the eccentric member on said first shaft.

28. A hypocycloid non-back drive comprising: a stationary housing having an internal gear with a circular arrangement of inwardly directed teeth, a first shaft, a second shaft, means rotatably mounting the first and second shafts on the housing, a ring gear having a circular arrangement of teeth and a diameter smaller than the diameter of the circular arrangement of the teeth of the internal gear whereby a portion of the external gear teeth mesh with a portion of the internal gear teeth, said ring gear having a continuous cylindrical inside surface concentric with the circular arrangement of the external gear teeth, means non-rotatably secured to the first shaft and extended radially outwardly from the first shaft and engageable with the cylindrical inside surface of the ring gear and acting against said inside surface of the ring gear when the first shaft is rotated to turn said ring gear around the internal gear of the housing, eccentric means mounted on the first shaft, means rotatably mounting the ring gear on the eccentric means whereby the eccentric means maintains the teeth of the ring gear in engagement with the teeth on the housing as the ring gear is turned around the internal gear of the housing, and means drivably connecting the second shaft and ring gear whereby movement of the ring gear around the internal gear of the housing rotates the second shaft.

29. The drive of claim 28 wherein: the second shaft has a bore in an end thereof, said first shaft having an end portion located in said bore and rotatably mounted on the second shaft to support the end portion of the first shaft.

30. The drive of claim 28 wherein: the means non-rotatably secured to the first shaft comprises an arm secured to the first shaft and extended radially therefrom and roller means rotatably connected to the arm located in engagement with the cylindrical inside surface of the ring gear.

31. The driving claim 28 wherein the eccentric means is an eccentric member having a cylindrical hole, said first shaft having a cylindrical shaft portion extended through said hole to rotatably mount the eccentric member on said first shaft.

32. A method of preventing back drive from a power input shaft back to a power input shaft with a housing having a circular arrangement of internal spur gear teeth and a ring gear having external spur gear teeth and a diameter smaller than the circular arrangement of internal spur gear teeth comprising: mounting the ring gear for rotation about an axis off-set from the axis of rotation of the power input shaft to maintain a portion of the external spur gear teeth in engagement with a portion of the internal spur gear teeth on the housing, turning the ring gear about the axis of the power input shaft with an arm means non-rotatably secured to the power input shaft acting against the ring gear inwardly of the external teeth of the ring gear, transmitting power from the ring gear to the power output shaft during the turning of the ring gear with the turning of the arms means, and preventing back drive from the power output shaft to the power input shaft by not turning the arm means.

33. The method of claim 32 wherein: the ring gear is rotatably mounted on an eccentric member mounted on the power input shaft.

34. A hypocycloid non-back drive comprising: a stationary housing having an internal gear with a circular arrangement of inwardly directed teeth, a first shaft, a second shaft, means rotatably mounting the first and second shafts on the housing, a ring gear having a circular arrangement of external gear teeth and a diameter smaller than the diameter of the circular arrangement of the teeth of the internal gear whereby a portion of the external gear teeth mesh with a portion of the internal gear teeth, said ring gear having a continuous inside track concentric with the circular arrangement of the external gear teeth, means non-rotatably secured to the first shaft and extended radially outwardly from the first shaft and engageable with the track of the ring gear and acting against said track of the ring gear when the first shaft is rotated to turn said ring gear around the internal gear of the housing, eccentric means mounted on the first shaft, means rotatably mounting the ring gear on the eccentric means whereby the eccentric means maintains the teeth of the ring gear in engagement with the teeth on the housing as the ring gear is turned around the internal gear of the housing, and means drivably connecting the second shaft and ring gear whereby movement of the ring gear around the internal gear of the housing rotates the second shaft.

35. The drive of claim 34 wherein: the second shaft has a bore in an end thereof, said first shaft having an end portion located in said bore and rotatably mounted on the second shaft to support the end portion of the first shaft.

36. The drive of claim 34 wherein: the means non-rotatably secured to the first shaft comprises an arm secured to the first shaft and extended radially therefrom and means rotatably connected to the arm located in engagement with the track of the ring gear.

37. The drive of claim 34 wherein: the eccentric means in an eccentric member having a cylindrical hole, said first shaft having a cylindrical shaft portion extended through said hole to rotatably mount the eccentric member on said first shaft.

* * * * *